United States Patent
Uehara

[11] Patent Number: 5,828,787
[45] Date of Patent: Oct. 27, 1998

[54] ENCODING APPARATUS AND ENCODING METHOD OF MOTION IMAGE

[75] Inventor: Kenji Uehara, Kanagawa, Japan

[73] Assignee: Sony Corporation, Tokyo, Japan

[21] Appl. No.: 750,985

[22] PCT Filed: Apr. 19, 1996

[86] PCT No.: PCT/JP96/01074

§ 371 Date: Dec. 19, 1996

§ 102(e) Date: Dec. 19, 1996

[87] PCT Pub. No.: WO96/33573

PCT Pub. Date: Oct. 24, 1996

[30] Foreign Application Priority Data

Apr. 21, 1995 [JP] Japan ..................................... 7-120509

[51] Int. Cl.[6] .................................................. G06K 9/36
[52] U.S. Cl. ........................................... 382/236; 382/236
[58] Field of Search ..................................... 382/232, 236, 382/238; 348/390, 397, 398, 399, 400, 401, 402, 405, 407, 409, 410, 411, 412, 413, 414, 415, 416, 419, 420, 424, 425, 431

[56] References Cited

U.S. PATENT DOCUMENTS

| | | | |
|---|---|---|---|
| 5,144,427 | 9/1992 | Kitaura et al. .......................... | 348/424 |
| 5,155,593 | 10/1992 | Yonemitsu et al. ...................... | 348/413 |
| 5,198,901 | 3/1993 | Lynch ....................................... | 348/413 |
| 5,486,862 | 1/1996 | Yagasaki ................................... | 348/399 |
| 5,543,846 | 8/1996 | Yagasaki ................................... | 348/415 |
| 5,570,133 | 10/1996 | Yagasaki ................................... | 348/416 |
| 5,621,464 | 4/1997 | Teo et al. ................................. | 348/390 |
| 5,659,363 | 8/1997 | Wilkinson ................................. | 348/398 |
| 5,745,181 | 4/1998 | Wilkinson ................................. | 348/415 |

FOREIGN PATENT DOCUMENTS

| | | |
|---|---|---|
| 2-274188 | 11/1990 | Japan . |
| 5-347758 | 12/1993 | Japan . |

Primary Examiner—Jose L. Couso
Attorney, Agent, or Firm—Frommer Lawrence & Haug LLP; William S. Frommer

[57] ABSTRACT

A period M of a picture of which picture coding type is I or P in a video input is changed like 2 and 3. CUR_M shows the present number of M. MAX_M, namely, the maximum number of M in a sequence which continues with respect to the time is equal to 3. A frame delay of MAX_M is given to a picture (1B, 2B, or the like) of which picture coding type is B. A frame delay of (MAX_M−CUR_M) is given to a picture (1I, 2I, or the like) of which picture coding type is I. In this manner, a sequence of a coding order is formed and a predictive encoding is performed, thereby forming a bit stream.

4 Claims, 5 Drawing Sheets

Fig. 1

| VIDEO INPUT | 1B | 1I | 2B | 2I | 3B | 3B' | 3I | 4B | 4B' | 4P | 5B | 5B' | 5P | 6B | 6I | 7B | 7P | 8B | 8P | | |
|---|---|---|---|---|---|---|---|---|---|---|---|---|---|---|---|---|---|---|---|---|---|
| CUR_M | | | 2 | 2 | 2 | 2 | 3 | 3 | 3 | 3 | 3 | 3 | 3 | 3 | 2 | 2 | 2 | 2 | 2 | 2 | 3 |
| FRAME DELAY AMOUNT | | 1 | 3 | 1 | 3 | 3 | 3 | 3 | 3 | 0 | 3 | 3 | 3 | 3 | 1 | 3 | 1 | 3 | 1 | 3 | |

MC PRESENT:

| 1I | 1B | 2I | 2B | 3I | 3B | 3B' | 4P | 4B | 4B' | 5P | 5B | 5B' | 6I | 6B | 7P | 7B | 8P | 8B |
|---|---|---|---|---|---|---|---|---|---|---|---|---|---|---|---|---|---|---|

MC FORWARD DIRECTION:

| | | 1I | | 2I | 3I | 3I | 3I | 4P | 4P | 4P | 5P | 6I | 6I | 7P | 7P |
|---|---|---|---|---|---|---|---|---|---|---|---|---|---|---|---|

MC REVERSE DIRECTION:

| | | 1I | | 2I | | 3I | 3I | 4P | 4P | 5P | 5P | 6I | 7P | 8P |
|---|---|---|---|---|---|---|---|---|---|---|---|---|---|---|

BIT STREAM:

| 1I | 1B | 2I | 2B | 3I | 3B | 3B' | 4P | 4B | 4B' | 5P | 5B | 5B' | 6I | 6B | 7P | 7B | 8P | 8B |
|---|---|---|---|---|---|---|---|---|---|---|---|---|---|---|---|---|---|---|

Fig. 2

| VIDEO INPUT | 1B | 1I | 2B | 2P | 3B | 3B' | 3I | 4B | 4B' | 4P | 5B | 5I | 6B | 6I | 7B | 7B' | 7B" | 7I | 8B | 8B' | 8B" | 8P | 9I | 10P |
|---|---|---|---|---|---|---|---|---|---|---|---|---|---|---|---|---|---|---|---|---|---|---|---|---|
| CUR_M | | | 2 | 2 | 2 | 2 | 3 | 3 | 3 | 3 | 3 | 2 | 2 | 2 | 2 | 2 | 2 | 4 | 4 | 4 | 4 | 4 | 1 | 1 |
| FRAME DELAY AMOUNT | | | 2 | 4 | 2 | 1 | 4 | 4 | 1 | 4 | 4 | 2 | 4 | 2 | 4 | 0 | 4 | 4 | 4 | 0 | 4 | 4 | 3 | 3 |
| MC PRESENT | 1I | 1B | 2P | 2B | 3I | 3B | 3B' | 4P | 4B | 4B' | 5I | 5B | 6I | 6B | 7I | 7B | 7B' | 7B" | 8P | 8B | 8B' | 8B" | 9I | 10P |
| MC FORWARD DIRECTION | | | | | 1I | 1I | | 2P | 2P | | 3I | 3I | 3I | | 4P | | | | 5I | | | | 8P | 8P |
| MC REVERSE DIRECTION | | | | | | | 2P | | | 3I | | 4P | 4P | | 5I | | | | 6I | | | | 8P | 8P |
| BIT STREAM | 1I | 1B | 2P | 2B | 3I | 3B | 3B' | 4P | 4B | 4B' | 5I | 5B | 6I | 6B | 7I | 7B | 7B' | 7B" | 8P | 8B | 8B' | 8B" | 9I | 10P |

Fig. 6

| VIDEO INPUT | 1B | 1I | 2B | 2I | 3B | 3B' | 3I | 4B | 4B' | 4P | 5B | 5B' | 5P | 6B | 6I | 7B | 7P | 8B | 8P |
|---|---|---|---|---|---|---|---|---|---|---|---|---|---|---|---|---|---|---|---|
| CUR_M | | 2 | | 2 | | | 3 | | | 3 | | | 3 | | 2 | | 2 | | 2 |

MC
- PRESENT — forward direction: 1I 1B 2I 2B  3I 3B 3B' 4P 4B 4B' 5P 5B 6I 6B 7P 7B 8P 8B
- FORWARD DIRECTION: 1I  2I 3I 4P 5P 6I 7P 8P
- REVERSE DIRECTION: 2I  3I 4P 5P 6I 7P 8P

↑ INTERPOLATION OR FREEZE WHEN DECODING

BIT STREAM: 1I 1B 2I 2B  3I 3B 3B' 4P 4B 4B' 5P 5B 6I 6B 7P 7B 8P 8B

↑ 5B' IS DROPPED

ENCODING APPARATUS AND ENCODING METHOD OF MOTION IMAGE

TECHNICAL FIELD

The present invention relates to an encoding apparatus and an encoding method of a motion image using a motion compensation.

BACKGROUND ART

A motion image encoding method represented by the MPEG (Moving Pictures Expert Group) standard has been known. In the MPEG, a GOP (Group of Pictures) structure which is constructed by a plurality of picture plane data is used. A random access can be executed on a unit basis of the GOP. In the MPEG, an I picture, a P picture, and a B picture are specified as picture coding types.

The I picture is an abbreviation of an Intra-Picture and denotes an intraframe encoded image. In the I picture, the whole picture plane is intra-encoded and is encoded in accordance with the same order as that of the original image. The P picture is an abbreviation of a Predictive-Picture and denotes an interframe forward direction predictive encoded image. That is, it is an image which is motion compensation predicted from a past image. There is also a case where the P picture includes an intra-encoded portion of a small block unit in the picture plane and it is encoded in accordance with the same order as that of the original image. The B picture is an abbreviation of a Bidirectionally Predictive-Picture and is a bidirectional predictive encoded image. That is, it is an image which is motion compensation predicted from past and future images. There is also a case where the B picture includes the intra-encoded portion of the small block unit in the picture plane.

It is assumed that at least one I picture is included in the GOP. One GOP is constructed by N, for example, 15 pictures (a time of 0.5 second) and the I picture or the P picture appears at every period M, for example, 3. Although the values of N and M are not specified, practically, a value corresponding to 0.4 second to several seconds is chosen for N and a value corresponding to about 3 to 6 is chosen for M. In the MPEG1, it is specified that the beginning of the GOP is the I picture on a bit stream and the last of the GOP in the order of the original picture plane is the I or P picture.

FIG. 6 shows a process when a sequence which continues with respect to the time is encoded by changing M in the above-mentioned MPEG encoding method. It is necessary to change M in case of continuously encoding image data of a television system in which frame frequencies are different such that they are equal to, for example, 25 Hz (in case of the television system such as a PAL system or the like) and 30 Hz (in case of the NTSC system). As another example, M is changed in the sequence even when two data of different M numbers are combined by an edition of a GOP unit.

FIG. 6 shows an example in which image signals of (M=2) and (M=3) are combined and a video input indicates an original image. CUR_M expresses the number of M for the present frame. Codes of B, I, and P denote the above-mentioned picture coding types.

In an encoding process of the B picture, after the I and P pictures were first processed, the B picture which is inserted between the I and P pictures is encoded. Consequently, the order of the pictures of the encoding process is different from the order (display order) of the original image. That is, no frame delay is given to the picture of the I or P type and a delay of the number of frames instructed by CUR_M is given to the picture of the B type, thereby allowing the picture of the B type to be inserted between pictures of the I or P type. "Present of MC (motion compensation)" in FIG. 6 shows the order which is rearranged from the order of images to the order (coding order) of encoding process as mentioned above.

In FIG. 6, the picture expressed as "MC forward direction" shows a past picture for the picture of the coding order and is used for a forward direction prediction. For example, for a picture shown by 4P, the past picture is 3I and a forward direction prediction is executed by using the picture 3I. A picture expressed as "Reverse direction of MC" shows a future picture for the picture of the coding order and is used for a reverse direction prediction. For example, for a picture shown by 2B, the past picture is 1I and the future picture is 2I and a bidirectional prediction is executed by using those pictures. An encoded output which is transmitted to a communication path or is recorded to a recording medium is a bit stream of the coding order. The predictive encoding of the MPEG is executed in a manner such that a frame difference between the predictive image which has been locally decoded and motion compensated and the present image is encoded by a DCT (Discrete Cosine Transform).

In the bit stream of the coding order in FIG. 6, data of one frame lacks in a portion where M is changed from 2 to 3 and a no-signal interval occurs. In case of decoding, it is consequently necessary to interpolate the drop-out frame data by an interpolation using a time base, for example, a pre-holding (called a freeze) in which the previous decoding image is repeated or a mean value interpolation in which the drop-out frame data is replaced by a mean value of data before and after it. Further, in the portion where M is changed from 3 to 2, one frame data is choked. In case of decoding as it is, a picture shown by 5B' is dropped out. As mentioned above, in the interval between the portion of M=2 and the portion of M=3, a time deviation of one frame occurs and a frame in which data is dropped out at a change point of M occurs.

Although the case where M is changed from 2 to 3 has been described with reference to FIG. 6, a similar result is obtained with respect to other changes in value of M. As the difference of values of M is large, the number of frames which need to be interpolated and the number of frames in which data is dropped out increase.

Therefore, it is an object of the invention to provide an encoding apparatus and an encoding method of a motion image, which can prevent the occurrence of a drop-out of image data and a deviation of the time base even when the period M of the I or P picture is changed at the time of the encoding process.

DISCLOSURE OF INVENTION

According to the invention, there is disclosed an encoding apparatus of a motion image in which encoded images of three types of an I picture as an intraframe encoded image, a P picture as an interframe forward direction predictive encoded image, and a B picture as a bidirectional predictive encoded image are formed by using a predictive encoding in the time direction and a period M at which the I or P picture appears is changed, characterized in that a frame rearranging unit to which an input image signal is supplied is provided at the front stage of an encoding unit of a predictive encoding, the frame rearranging unit receives a picture coding type instructed for the input image signal, CUR_M showing the number of M of the present frame, and MAX_M showing the maximum number of M in a sequence which continues with respect to the time, and the apparatus has a frame delay control unit for giving to the input image signal a frame delay which is defined in a manner such that
frame delay=MAX_M-CUR_M
for the picture of which picture coding type is I or P and
frame delay=MAX_M
for the B picture.

According to the invention, there is provided an encoding method of a motion image in which encoded images of three types of an I picture as an intraframe encoded image, a P picture as an interframe forward direction predictive encoded image, and a B picture as a bidirectional predictive encoded image are formed by using a predictive encoding in the time direction and a period M at which the I or P picture appears is changed, characterized in that a picture coding type instructed for an input image signal, CUR_M showing the number of M of the present frame, and MAX_M showing the maximum number of M in a sequence which continues with respect to the time are received, and a frame delay which is defined in a manner such that
frame delay=MAX_M-CUR_M
for the picture of which picture coding type is I or P and
frame delay=MAX_M
for the B picture, is given to the input image signal, thereby forming data of a coding order.

In the invention, different from a technique of referring to only the picture coding type which is instructed for the input image signal, the frame delay is given in consideration of the maximum number of M in the sequence which continues with respect to the time, thereby preventing a drop-out of a frame image or an. original frame image.

BRIEF DESCRIPTION OF DRAWINGS

FIG. 1 is a timing chart showing a process of an embodiment of an encoding method according to the invention;

FIG. 2 is a timing chart showing a process of another embodiment of an encoding method according to the invention;

FIG. 6 is a timing chart showing a process of an encoding method to which the invention can be applied.

BEST MODE FOR CARRYING OUT THE INVENTION

By paying attention to a point that the above problems occur when a process of a frame unit is determined only by referring to picture coding types I, P, and B, the invention is characterized by using the maximum number of M (hereinlater, called MAX_M) of a sequence which continues with respect to the time (it denotes a unit to be processed which continues with respect to the time) and the number of M (hereinlater, called CUR_M) of the present frame.

According to the invention, a frame delay corresponding to (MAX_M-CUR_M) is given to a picture of which coding type is I or P and a frame delay corresponding to (MAX_M) is given to the B picture. That is, the frame delay is given in accordance with the following equations.

In case of the I or P picture,
frame delay=(MAX_M-CUR_M)
In case of the B picture,
frame delay=(MAX_M)

By giving the frame delay as mentioned above, a time deviation between frames is eliminated and preferable encoding and decoding operations can be executed. As a specific example, FIG. 1 shows an example in which the invention is applied to a case where M is changed from 2 to 3 like the foregoing example of FIG. 6.

In the example of FIG. 1, MAX_M in the sequence which continues with respect to the time is equal to 3. Therefore, a delay of three frames is given to the B picture. A delay of (3-CUR_M) frames is given to the I or P picture. A frame delay amount in FIG. 1 shows a frame delay determined in such a manner.

That is, with respect to each picture in a sequence expressed as "MC (present)", a frame delay amount for a video input is written on the upper side. For example, a delay of (3-2=1) frame is given to an image of 1I and a delay of three frames is given to an image of 1B. The video input (display order) is converted into an image of a coding order expressed as "MC (present)" by the frame delay given as mentioned above.

In FIG. 1, each picture of "MC (forward direction)" is a picture which is used for a forward direction prediction of a picture of "MC (present)". Each picture of "MC (reverse direction)" is a picture which is used for a reverse direction prediction of the picture of "MC (present)". The whole image which has been converted to the coding order is encoded in accordance with each picture coding type and a compression encoded output of the coding order shown as a bit stream in FIG. 1 is obtained.

The bit stream is obtained by executing an intraframe encoding to the I picture, executing a forward direction predictive encoding to the P picture, and executing a bidirection predictive encoding to the B picture. The predictive encoding in case of the MPEG is executed in a manner such that a frame difference between the predictive image which has been locally decoded and motion compensated and the present image is obtained and the frame difference is DCT encoded and DCT coefficient data is quantized. The DCT coefficients are further variable-length encoded.

Figure 3:
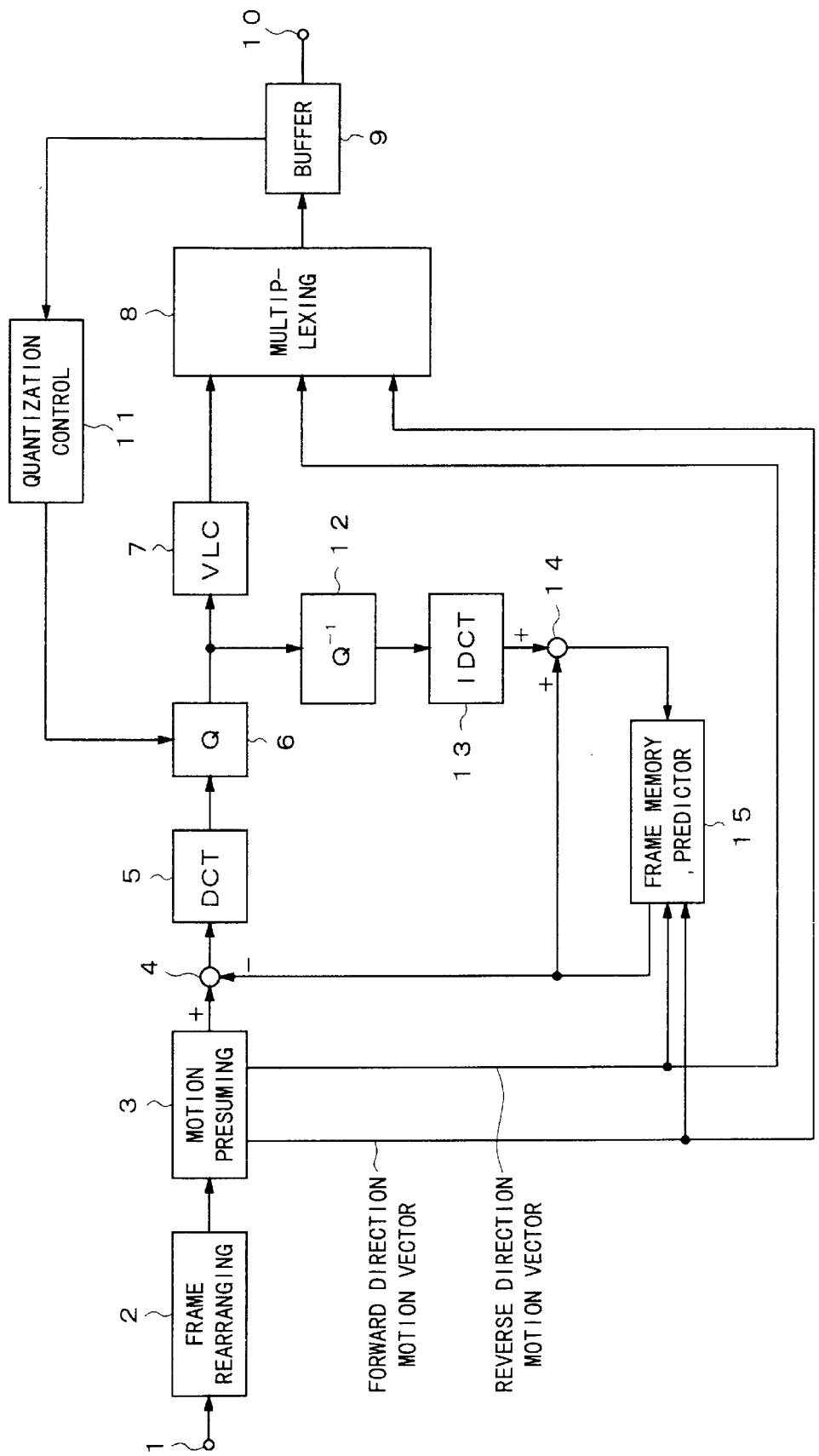
FIG. 3 is a block diagram showing an embodiment of an encoding apparatus to which the invention is applied.

As will be understood by comparing FIGS. 1 and 3, according to the invention, no drop-out of the image between pictures 2B and 3I occurs and a drop-out of a picture 5B' can be prevented in the interval where M in the bit stream is changed.

FIG. 2 shows another embodiment of the invention. In another embodiment, as will be understood from the video input, the value of M is sequentially changed like 2, 3, 4, and 1. Since MAX_M =4, a delay of four frames is given to the B picture. A frame delay of (MAX_M-CUR_M) is given to the I or P picture. That is, when CUR_M=1, a delay of three frames is given to the I or P picture. When CUR_M=2, a delay of two frames is given. When CUR_M=3, a delay of one frame is given. When CUR_M=4, no frame delay is given.

In a manner similar to the foregoing embodiment, the frame delay amount which is given to each frame in the sequence expressed as "MC (present)" is also shown. For example, a frame delay of (4-2=2) is given to the image of 1I and the delay of four frames is given to the image of 1B.

Even when the value of M is changed like 1, 2, 3, and 4 as in another embodiment, it can be prevented that the image data is dropped out and an interpolation is required. No drop-out occurs due to a choke of image data.

FIG. 3 shows a structure of an embodiment of an encoding apparatus for realizing the above-mentioned encoding method according to the invention. A digital video signal from an input terminal 1 is supplied to a frame rearranging circuit 2. The frame rearranging circuit 2 converts the order (display order) of the input video signal to the coding order by giving the above-mentioned frame delay.

An output of the frame rearranging circuit 2 is supplied to a motion presuming circuit 3. In the motion presuming circuit 3, a motion vector (forward direction motion vector) from a past image to a present image and a motion vector (reverse direction motion vector) from a future image to the present image are detected. Those motion vectors are supplied to a frame memory/predictor 15 and a forward direction motion compensation prediction, a reverse direction motion compensation prediction, and a bidirectional motion compensation prediction are performed.

A subtracting circuit 4 is provided after the motion presuming circuit 3. In the subtracting circuit 4, a difference between the input image signal and a prediction signal from the frame memory/predictor 15 is calculated. Although not shown, a control signal instructing the picture coding type (I, P, or B) of each frame of the input image signal is supplied to the frame rearranging circuit 2 and frame memory/predictor 15. As will be described hereinlater, the frame rearranging circuit 2 gives a frame delay to each frame on the basis of the control signal. The frame memory/predictor 15 outputs a forward direction motion compensation predictive image in case of the P picture, a bidirectional motion compensation predictive image in case of the B picture, and image data of 0 in case of the I picture.

An output signal of the subtracting circuit 4 is supplied to a DCT (Discrete Cosine Transform) converting circuit 5 and coefficient data from the converting circuit 5 is quantized by a quantizing circuit 6. An output of the quantizing circuit 6 is subjected to a variable-length encoding by an encoder 7 of a variable length code and is also supplied to an inverse quantizing circuit 12. An output of the inverse quantizing circuit 12 is supplied to an inverse converting circuit 13 and an output of the inverse converting circuit 13 is supplied to an adding circuit 14.

The output of the frame memory/predictor 15 is supplied to the adding circuit 14 and a local decoding signal is generated from the adding circuit 14. The local decoding signal is supplied to the frame memory/predictor 15.

An output signal of the encoder 7 of the variable-length encoding, the forward direction motion vector, and the reverse direction motion vector are supplied to a multiplexing circuit 8 and those motion vectors are multiplexed into a bit stream. An output (bit stream) of the multiplexing circuit 8 is extracted to an output terminal 10 via a buffer 9. The bit stream extracted to the output terminal 10 is transmitted through a communication path or is recorded to a recording medium. The buffer 9 is provided for a rate control. A remaining amount of a memory capacity of the buffer 9 is monitored. When data at a predetermined rate is outputted, it is controlled so as not to cause an overflow or underflow of the buffer 9 by controlling the quantizing circuit 6.

In the above-mentioned motion compensation interframe predictive encoding (as an example, MPEG), by giving the frame delay in the frame rearranging circuit 2 on the basis of the foregoing rules, a situation such that a frame which is necessary to be interpolated occurs in an output stream or a frame is dropped out can be prevented.

Figure 4:
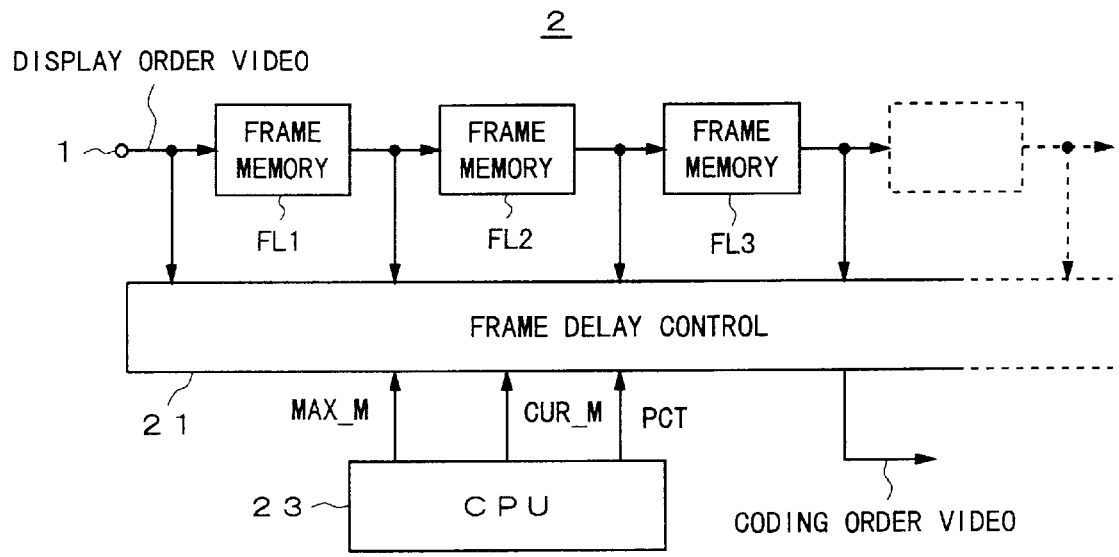
FIG. 4 is a block diagram showing an example of a frame rearranging circuit in an embodiment of the invention.

FIG. 4 shows a structure of an example of the frame rearranging circuit 2. A video signal of the display order from the input terminal 1 is inputted to a cascade connection of frame memories FL1, FL2, FL3, . . . . The number of frame memories to be connected depends on the maximum value of the frame delay amount which is given. The input video signal and output video signals of the frame memories are supplied to a frame delay control circuit 21.

The frame delay control circuit 21 receives information of MAX_M, CUR_M, and PCT (picture coding type) from a CPU 23, determines a frame delay amount to be given, and selects an output signal of the frame memory corresponding to the determined frame delay amount. The CPU 23 comprises a control circuit for controlling the whole encoding operation. The selected video signal is outputted as a coding order video signal from the frame delay control circuit 21.

Figure 5:
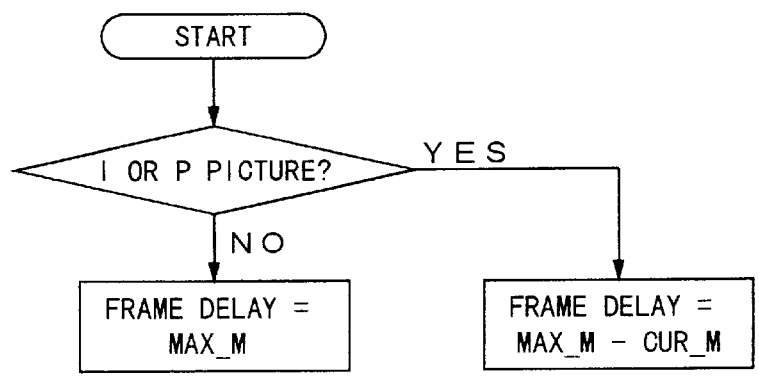
FIG. 5 is a flowchart showing the operation of the frame rearranging circuit.

FIG. 5 shows a process for determining the frame delay amount which is executed in the frame delay control circuit 21. Whether the picture coding type of the input image frame is I or P is determined with reference to the PCT received from the CPU 23. When the type of the frame of the input image is I or P, the frame delay which is given to the frame is calculated by (MAX_M-CUR_M). If the type of the input image frame is not I or P, the frame delay which is given to the frame is set to (MAX_M).

The invention is not limited to the MPEG but can be applied to an encoding method of a motion image for performing a predictive encoding by the bidirection prediction.

The invention has an advantage such that even when M is changed, the encoding and decoding operations can be performed while keeping a time-dependent continuity by using two parameters of the maximum number of M and the present number of M of the sequence which continues with respect to the time.

Many modifications and variations can be considered within purview of the invention without departing from the spirit thereof. Therefore, the essence of the invention is not limited to the foregoing embodiments.

I claim:

1. An encoding apparatus of a motion image in which encoded images of three types of an I picture as an intraframe encoded image, a P picture as an interframe forward direction predictive encoded image, and a B picture as a bidirection predictive encoded image are formed by using a predictive encoding in a time direction and a period M at which said I or P picture appears is changed, characterized in that a frame rearranging unit to which an input image signal is supplied is provided at the front stage of an encoding unit of a predictive encoding, said frame rearranging unit receives a picture coding type instructed for said input image signal, CUR_M showing the number of M of a present frame, and MAX_M showing the maximum number of M in a sequence which continues with respect to a time, and the apparatus has a frame delay control unit for giving a frame delay to said input image signal, said frame delay being defined in a manner such that frame delay=MAX_M-CUR_M for said picture of which picture coding type is I or P and frame delay=MAX_M for said B picture.

2. An encoding apparatus of the motion image according to claim 1, characterized in that the encoding unit of said predictive encoding executes a motion compensation predictive encoding.

3. An encoding method of a motion image in which encoded images of three types of an I picture as an intraframe encoded image, a P picture as an interframe forward direction predictive encoded image, and a B picture as a bidirectional predictive encoded image are formed by using a predictive encoding in a time direction and a period M at which said I or P picture appears is changed, characterized in that a picture coding type instructed for an input image signal, CUR_M showing the number of M of a present frame, and MAX_M showing the maximum number of M in a sequence which continues with respect to the time are received, and a frame delay which is defined in a manner such that frame delay=MAX_M−CUR_M for a picture of which picture coding type is I or P and frame delay=MAX_M for said B picture is given to said input image signal, thereby forming data of a coding order.

4. An encoding method of a motion image according to claim 1, characterized in that the formed data of the coding order is further subjected to a predictive encoding of a motion compensation.

\* \* \* \* \*